Feb. 22, 1938.  M. L. GARRISON ET AL  2,109,385
AUTOMATIC CULTIVATOR FOOT FOR TRACTORS
Filed Feb. 25, 1937  2 Sheets-Sheet 1
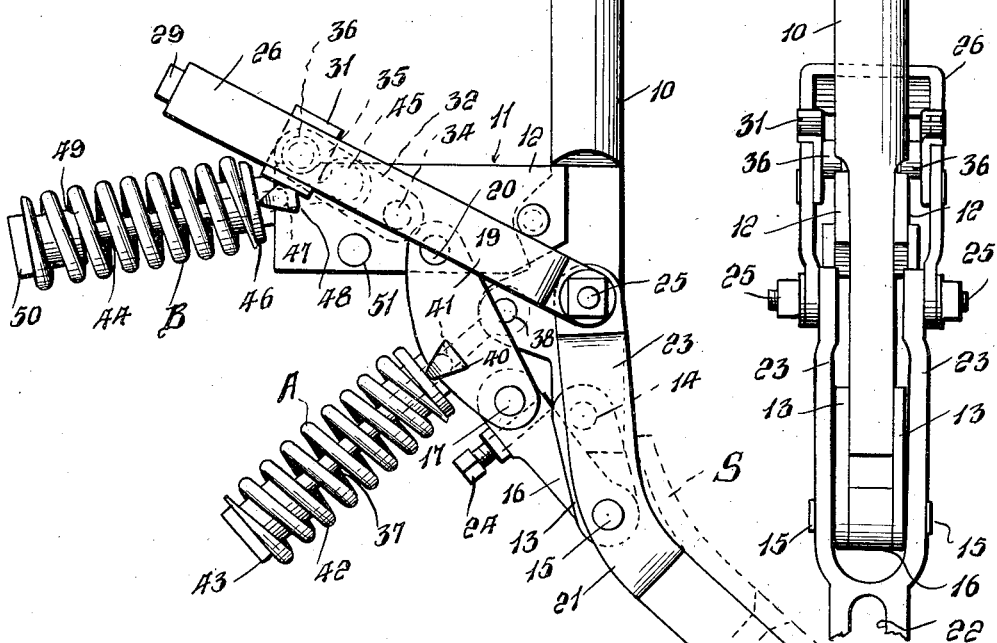
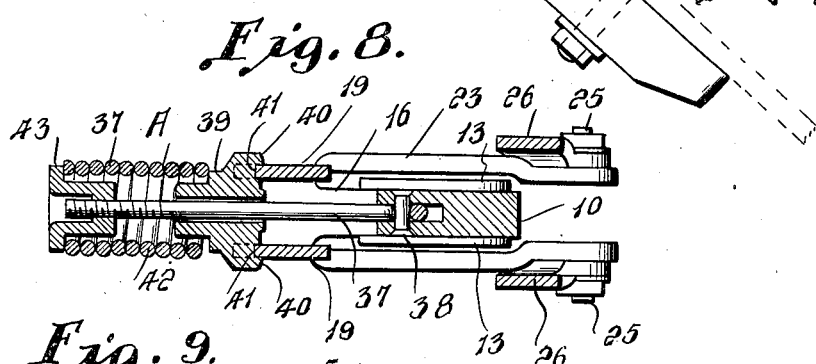
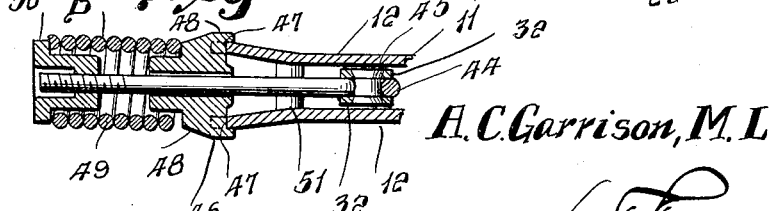
Inventors
A. C. Garrison, M. L. Garrison
By L. F. Randolph
Attorney Feb. 22, 1938. M. L. GARRISON ET AL 2,109,385
AUTOMATIC CULTIVATOR FOOT FOR TRACTORS
Filed Feb. 25, 1937 2 Sheets-Sheet 2
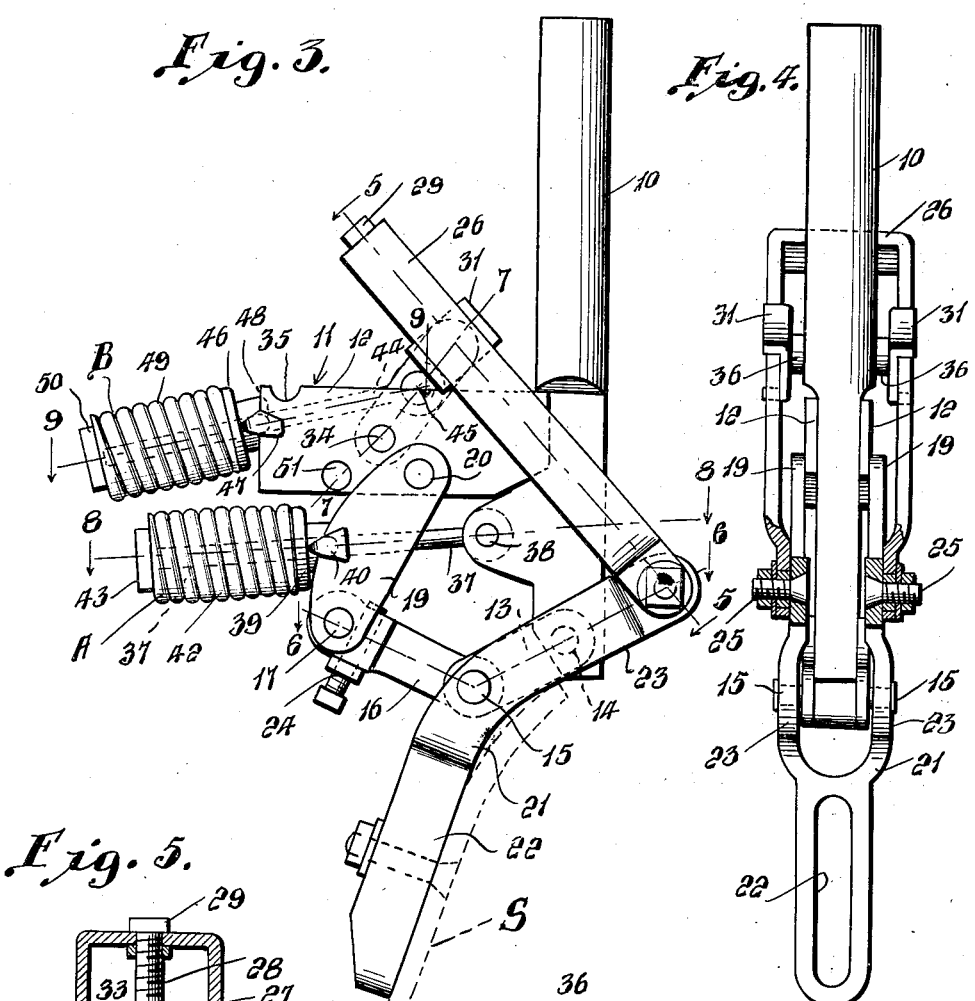
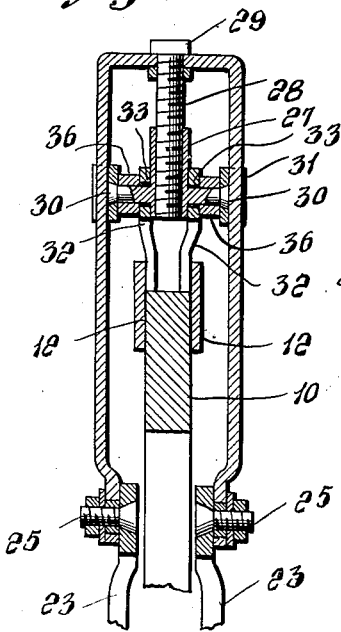
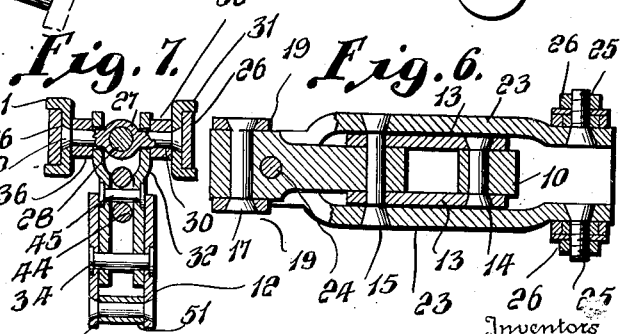
Inventors
A C Garrison, M L Garrison
By L. F. Randolph
Attorney Patented Feb. 22, 1938

2,109,385

UNITED STATES PATENT OFFICE 2,109,385

AUTOMATIC CULTIVATOR FOOT FOR TRACTORS

Mett L. Garrison and Alfred C. Garrison, England, Ark.

Application February 25, 1937, Serial No. 127,754

4 Claims. (Cl. 97—184)

This invention relates to a mounting means for a sweep, shovel or the like as used on tractor drawn or other cultivators or agricultural implements and it aims to provide a novel construction which will permit the sweep or shovel to yield automatically upon encountering an obstruction and which particularly provides for both rearward swinging movement of the sweep or shovel and a decided raising movement thereof in order to avoid the dragging action or motion encountered in existing constructions of yielding shovels or sweeps.

It is aimed to provide a novel construction of means for attaching the shank to the beam, with associated spring return means, and a co-acting lever or bracket operated by the shank, and with which shank or bracket a novel adjustable and spring control co-acts.

The more specific objects and advantages will become apparent from a consideration of the description following taken in connection with accompanying drawings illustrating an operative embodiment.

In said drawings:—

Figure 1 is a view in elevation showing our improvements;

Figure 2 is a front elevation looking from the right of Figure 1;

Figure 3 is a view similar to Figure 1 but showing the parts in the position they assume when an obstruction is encountered by the sweep or shovel;

Figure 4 is an elevational view partly in section;

Figure 5 is a detail section taken on the line 5—5 of Figure 3;

Figure 6 is a detail section taken on the line 6—6 of Figure 3;

Figure 7 is a detail section taken on the line 7—7 of Figure 3;

Figure 8 is a detail section taken on the line 8—8 of Figure 3; and

Figure 9 is a detail section taken on the line 9—9 of Figure 3.

Referring specifically to the drawings wherein like reference characters designate like or similar parts, 10 represents a conventional support, beam or the like such as depends from a tractor-drawn cultivator. From this support or beam, an arm 11 extends rearwardly, being integral therewith and comprising spaced apart arm members 12.

At the lower end portion of support 10, one or more links 13 are pivotally connected by means of a horizontal pin or pivot 14, to the other ends of which links 13, a pivot pin 15 is loosely connected on which a balance or connecting link 16 is pivoted intermediate the links 13, the other end of the balance link 16 being pivotally connected by means of a pin 17, to pressure lever means consisting of lever members 19, engaging opposite sides of the arm 11 and pivotally connected thereto by means of a transverse pin at 20.

A foot or shank 21 is adapted to have the sweep, shovel or equivalent implement detachably fastened thereto by means of bolts engaging the slot 22 thereof. Such shank is bifurcated to provide portions or arms 23 which are pivotally mounted on the extremities of the pin 15. A balance screw 24 is adjustably screw threaded to the balance link 16.

The foot or shank 21 is normally in the position shown in Figure 1 and so urged by spring means hereinafter described.

Pivotally connected to the upper extremities of the arms or portions 23 of the shank as by means of bolts 25 is a U-shape strap 26 which is disposed about the arm 11.

Located within the strap 26 is a sleeve 27 adjustable longitudinally of the strap since it engages the threads of a screw 28 passing adjustably through an opening in the strap and fastened in adjusted positions to the strap through the manipulation of nuts 29 on the threads of the screw. Said sleeve 27 has studs 30 extending therefrom, which are provided with U-shaped feet 31 pivoted thereon and engaging the adjacent sides of the strap 26. A pair of links 32 have enlarged openings 33 through which the studs 30 pass and such links 32 are pivoted to a pin 34 disposed transversely of the arm 11. It is to be noted that the studs 30 are adapted to normally rest in socket notches 35 in the upper edges of the arm members 12, adjacent the rear thereof. However, in preference to having direct engagement of the studs, rollers 36 are preferably journaled on the studs and engaged in said notches 35.

Two spring devices are used to normally maintain the parts in the position of Figure 1 and to urge them thereto, the same being similar and shown at A and B. Spring A has a rod 37 pivoted on a horizontal pin 38 to the support 10 between the pivot 14 and the arm 11. Rod 37 extends rearwardly between the lever members 19 passing loosely through a saddle 39 having ears 40 detachably anchored or resting in notches 41 in the lever members 19. A compressed coil spring 42 surrounds the adjacent portion of rod 37 and is seated on the saddle 39 at one end and is seated at the other end on a nut 43 screw threaded to such rod and operable to vary the compression of the spring 42.

Said spring device B has a rod 44 pivoted to a pin 45 to the links 32 between their pivots at 34 and 30. A saddle 46 like that at 39, is loosely disposed on the rod 44 and the saddle has ears 47 loosely engaged in notches 48 in the rear ends of the arm members 12. A compressed coil spring 49 surrounds the rod 44, engaging the saddle 46, and also engaging a nut at 50 which is screw threaded on the rod 44 and operable to compress the spring 49.

As a result of the construction described, when the sweep or plow rigidly attached to the foot or shank 21 engages an obstruction, it will automatically move from the normal position of Figure 1 to the position of Figure 3, the parts swinging on the axes at 14 and 15, so that the sweep or shovel will not only move rearwardly but will have a decided vertical movement to avoid dragging. This action places the spring 42 under greater compression. Such rearward movement of the shank also pulls on the strap so that it moves to the position of Figure 3, also against the compression of the spring 49. Since the movement of the sweep or shovel to avoid the obstruction is decidedly vertical as well as rearward, it will readily return to operative position through the compression of the springs 42 and 49, the spring 42 primarily serving to swing the sweep or shovel and necessary parts forwardly while the spring 49 primarily serves to impart the necessary lowering movement to the sweep or shovel. It will be realized that the throw of the strap is governed through the adjustment of the screw 28 at the nuts 29 and sleeve 27.

The arm members 12 adjacent their rear ends are reenforced by a stud device 51.

Various changes may be resorted to provided they fall within the spirit and scope of the invention.

We claim as our invention:—

1. A device of the class described having a support, a plurality of parts in articulate relation pivoted at extremities to said support, a sweep-mounting shank pivoted to one of the parts in spaced relation to the support, spring means associated with said parts and adapted to be compressed through displacement of the shank, a strap means engaged with the shank above the axis of the latter, and spring means adapted to be compressed through the movement of the strap means.

2. A device of the class described having a support, a plurality of parts in articulate relation pivoted at extremities to said support, a sweep-mounting shank pivoted to one of the parts in spaced relation to the support, spring means associated with said parts and adapted to be compressed through displacement of the shank, a strap means engaged with the shank above the axis of the latter, spring means adapted to be compressed through the movement of the strap means, comprising an arm on the support, a link pivoted to the arm and engaged with the strap, a rod pivoted to the link, a saddle on the rod engaging the arm, and spring means on the rod seated on the saddle.

3. A device of the class described comprising a support having an arm extending rearwardly therefrom, a plurality of parts in articulate relation pivoted to the arm and to the support below the arm, a sweep-mounting shank pivoted to the articulate parts in spaced relation to the support, said articulate parts including a lever, a rod pivoted to the support between said arm and the axis of the shank, a saddle on the rod interengaged with the lever, and spring means on the rod engaging said saddle and adapted to be compressed through displacement of the shank.

4. A device of the class described comprising a support having an arm extending rearwardly therefrom, a plurality of parts in articulate relation pivoted to the arm and to the support below the arm, a sweep-mounting shank pivoted to the articulate parts in spaced relation to the support, said articulate parts including a lever, a rod pivoted to the support between said arm and the axis of the shank, a saddle on the rod interengaged with the lever, spring means on the rod engaging said saddle and adapted to be compressed through displacement of the shank, a strap attached to the shank above the axis of the latter, and spring means adapted to be compressed through the movement of said strap.

METT L. GARRISON.
ALFRED C. GARRISON.